Aug. 15, 1939.   L. K. SWART   2,169,821
ELECTRICAL SWITCHING AND CONTROL SYSTEM
Filed Oct. 30, 1937
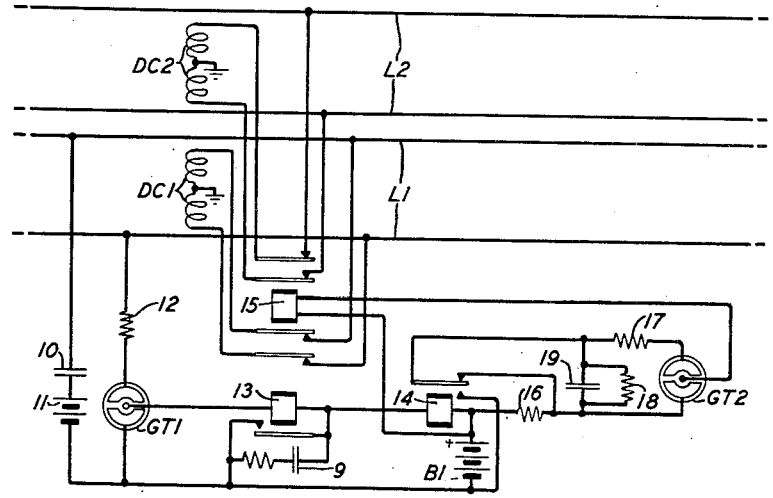
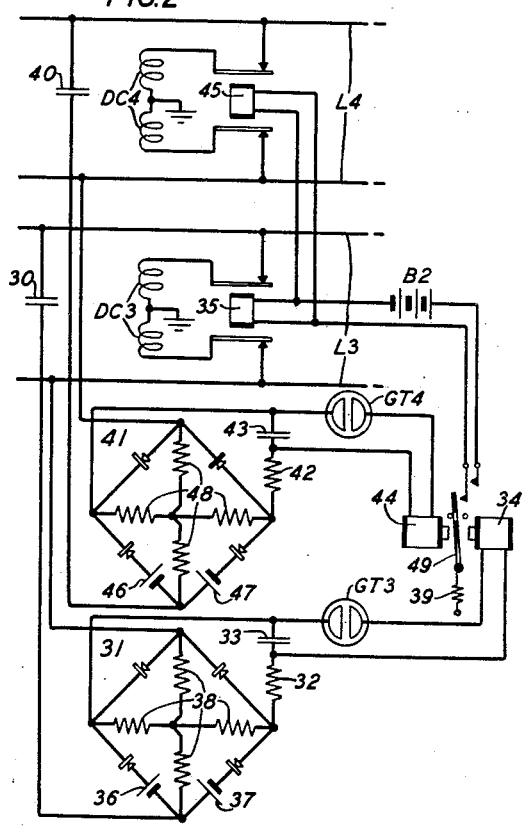
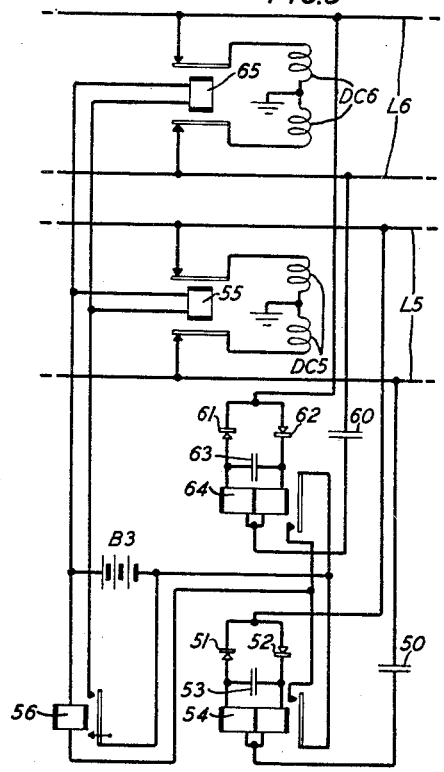
INVENTOR
*L. K. SWART*
BY
ATTORNEY Patented Aug. 15, 1939

2,169,821

UNITED STATES PATENT OFFICE 2,169,821

ELECTRICAL SWITCHING AND CONTROL SYSTEM

Leland K. Swart, Mountain Lakes, N. J., assignor to Bell Telephone Laboratories, Incorporated, New York, N. Y., a corporation of New York Application October 30, 1937, Serial No. 171,915

18 Claims. (Cl. 179—175.3)

This invention relates to electrical switching devices and particularly to circuit arrangements for controlling such devices.

It is the object of the invention to provide simple, efficient and reliable means for controlling electrical switching devices and to facilitate the testing of electrical lines and electrical apparatus.

It is known that high voltage disturbances are induced in open-wire lines, such for instance as are used for communication or other signaling, during electrical storms. The induced surges produce sharp clicks in telephone circuits and may cause false operation of electrical signaling apparatus. To protect against such surges it is known to connect a drainage coil across the two conductors of each open-wire line at the point where the line connects with an entrance cable or other protected conductors, the mid-point of the drainage coil being connected to ground. It is, however, necessary to disconnect the drainage coil from a line to enable testing of the line; and it has heretofore been the practice to provide pole switches for disconnecting the drainage coils. In some cases the pole switch has been manually operated; and in some cases, where extra line conductors were available the switch has been electrically controlled over the spare conductors.

This invention is a switching arrangement for disconnecting from a line, electrical apparatus normally connected thereto, the switching mechanism being controlled over the line or one of the lines from which the normally connected apparatus is to be disconnected. According to the invention, means are provided for delaying the operation of the switching mechanism to prevent false operation responsive to disturbances such as are caused by lightning.

A feature of the invention is a switching arrangement for disconnecting from lines, apparatus normally connected thereto, the switching mechanism being operatively controlled over a plurality of the lines and responsive only to alternating current.

A further feature of the invention is a switching arrangement for disconnecting from lines, apparatus normally connected thereto, the switching mechanism being operatively controlled over one of said lines to disconnect the normally connected apparatus and operatively controlled over another of the lines to reconnect the normally connected apparatus. The switching mechanism may comprise a self-locking control relay having an operating winding connected to one of the lines and a releasing winding connected to another of the lines.

These and other features of the invention will be more readily understood by considering the operation of the various circuit arrangements shown schematically in the drawing which forms a part of this specification. The invention is not limited in its application to the particular circuit arrangements herein disclosed but is in general applicable to any remotely controlled switching mechanism.

Referring to the drawing:

Fig. 1 shows lines L1 and L2 having drainage coils DC1 and DC2 normally connected thereto, a relay 15 for disconnecting the coils from the lines, and control means comprising gas-filled tubes GT1 and GT2 and relays 13 and 14;

Fig. 2 shows lines L3 and L4 having drainage coils DC3 and DC4 normally connected thereto, relays 35 and 45 for disconnecting the drainage coils from the lines, and control means comprising gas-filled tubes GT3 and GT4, rectifiers 31 and 41, and the self-locking relay 34, 44;

Fig. 3 shows lines L5 and L6 having drainage coils DC5 and DC6 normally connected thereto, relays 55 and 65 for disconnecting the drainage coils from the lines, and control means comprising relays 54, 64 and 56.

Consider first the arrangement shown in Fig. 1, in which drainage coils DC1 and DC2 are normally connected through contacts of relay 15 to the conductors of lines L1 and L2. The gas-filled tubes GT1 and GT2 are three-element cold-cathode tubes which, with no biasing potential, become conductors when over 70 volts is impressed across the control elements. A biasing battery 11 is shown connected to the lower element of tube GT1, which bias may be large enough to reduce the operating potential of the tube GT1 to as low as 20 volts. One conductor of line L1 is connected through condenser 10 and biasing battery 11, if any, to one of the control elements of tube GT1 and the other conductor of line L1 is connected through resistor 12 to the other control element of tube GT1. Whenever test of either or both of lines L1 and L2 is desired, a source of alternating current of high enough potential to cause breakdown of tube GT1 is impressed across the conductors of line L1. Relays 13 and 14 are thereupon operated by current in the circuit traced from the negative pole of battery B1, lower element or cathode of tube GT1, middle element or anode of tube GT1, through the windings of relays 13 and 14 in series to the positive pole of battery B1. Relay 13 is a vibrating relay, the closure of its front contact being effective to hold relay 14 and cause the deenergization of tube GT1 and release of relay 13 in well-known manner. The operating potential not having been disconnected, the tube GT1 and relay 13 reoperate; and relay 13 continues to operate and release as long as the breakdown potential is impressed across line L1. Relay 14 remains operated as long as relay 13 is vibrating, the winding of relay 14 being energized by current charging condenser 9 each time relay 13 releases. Relay 14 opens the normally closed short circuit across condenser 19 and across the control elements of tube GT2 and connects battery B1 across condenser 19. As soon as condenser 19 is charged to a potential high enough to cause breakdown of the tube, relay 15 is energized in a circuit from the negative pole of battery B1, through the front contact of relay 14, resistor 17, cathode and anode of tube GT2, and through the winding of relay 15 to the positive pole of battery B1. The delay in energizing tube GT2 prevents the operation of relay 15 in case the tube GT1 and relays 13 and 14 respond to transient disturbances, such for instance as are caused by lightning. Relay 15 disconnects drainage coils DC1 and DC2 from lines L1 and L2 thereby enabling the application of a direct current test to either or both of these lines. If line L1 is tested the testing current is superimposed on the alternating current which is causing the vibration of relay 13. When the test is completed and the alternating current source is disconnected from line L, the tube GT2 becomes deenergized, relay 13 cannot reoperate, and relay 14 releases. The release of relay 14 closes the short circuit across the control elements of tube GT2 causing the deenergization of the tube and the release of relay 15. Relay 15 may be a multicontact relay and control the connection of drainage coils to other lines in addition to lines L1 and L2.

Referring now to the arrangement shown in Fig. 2, drainage coils DC3 and DC4 are normally connected through contacts of relays 35 and 45 to the conductors of lines L3 and L4. Relays 35 and 45 are controlled by a self-locking relay comprising armature 49 and two coils 34 and 44. Coil 34 is operatively connected through the two-element gas-filled tube GT3 and rectifier 31 in series with condenser 30 across the conductors of line L3; and coil 44 is operatively connected through the two-element gas-filled tube GT4 and rectifier 41 in series with condenser 40 across the conductors of line L4. The armature 49 is held by spring 39 in either of its positions when once moved to either of these positions by the temporary energization of coil 34 or coil 44. Each of the rectifiers 31 and 41 comprises four rectifying elements of the copper-oxide type connected to provide full wave rectification. Biasing batteries 36 and 37 and biasing batteries 46 and 47 may or may not be provided, depending upon the relation between the potential impressed across lines L3 and L4 and the potential which is effective to cause breakdown of tubes GT3 and GT4. The resistors 38 and resistors 48 are provided only in case biasing batteries 36 and 37 and biasing batteries 46 and 47 are provided. When test of a line L3 or L4 is desired, a source of alternating current of required potential is temporarily impressed across the conductors of line L3. As soon thereafter as condenser 33 is charged to the breakdown potential, tube GT3 breaks down and coil 34 is energized. Armature 49 is thereupon attracted to close circuits including battery B2 for operating relays 35 and 45. Relays 35 and 45 disconnect drainage coils DC3 and DC4 from lines L3 and L4. Since the armature 49 is retained in its right-hand position by spring 39, the alternating current source which effected the breakdown of tube GT3 is disconnected so that the tube GT3 and coil 34 are deenergized. A source of direct current may then be connected to either of lines L3 and L4 for testing. When the testing of the lines is complete, the source of alternating current is momentarily impressed across the conductors of line L4. As soon thereafter as condenser 43 is charged to the breakdown potential, tube GT4 breaks down and coil 44 is energized, armature 49 being moved to its left-hand position. The resulting release of relays 35 and 45 reconnects the drainage coils DC3 and DC4 to lines L3 and L4. Upon termination of the application of the alternating current source to line L4 the tube GT4 and coil 44 are deenergized. Obviously, a single multicontact relay can be substituted for relays 35 and 45; furthermore, the connection of drainage coils to other lines can be controlled over lines L3 and L4. The resistors 32 and 42 control the charging of condensers 33 and 43 to provide the desired delay in the breakdown of tubes GT3 and GT4 so as to prevent false operation due to lightning or other transients.

Referring now to the arrangement shown in Fig. 3, drainage coils DC5 and DC6 are normally connected through contacts of relays 55 and 65 to the conductors of lines L5 and L6. The operation of relays 55 and 65 to disconnect the drainage coils from lines L5 and L6, and from other lines if desired, may be effected by impressing a source of alternating current either across the conductors of line L5 or across the conductors of line L6. The windings of relay 54 are connected in series with rectifier elements 51 and 52 and in series with condenser 50 across the conductors of line L5 and the windings of relay 64 are connected in series with rectifier elements 61 and 62 in series with condenser 60 across the conductors of line L6. If and when a source of alternating current of high enough potential is impressed across the conductors of line L5, relay 54 operates, one of its windings being energized during one-half of each cycle and the other of its windings being energized during the other half of each cycle. As soon as relay 54 operates it closes a circuit for operating relay 56, and relay 56 closes circuits for operating relays 55 and 65. As long as the source of alternating current is connected to line L5, relays 55 and 65 are held operated, so that a direct current test may be applied to either of lines L5 and L6 or to any other line, the drainage coil of which is disconnected by the operation of relay 55 or 65. Alternatively, a source of alternating current of high enough potential may be impressed across the conductors of line L6 instead of across the conductors of line L5. In this case relay 64 operates, its windings being alternately energized during each half-cycle. Relay 64 closes a circuit for operating relay 56 and relay 56 closes the circuits for operating relays 55 and 65. Relay 56 is provided to introduce a delay in the operation of relays 55 and 65 so as to prevent false operation in case relay 54 or relay 64 is temporarily operated by lightning or other transient disturbances. If relays 56 and 64 are slow in operating, relay 56 may be omitted, in which case relays 55 and 65 are directly controlled by relays 54 and 64.

What is claimed is:

1. In combination in an electrical system, a line, a protective device connected to the conductors of said line, a relay operatively connected to said line for disconnecting said device from said line, circuit means for rendering said relay operatively responsive to alternating current transmitted over said line and for preventing the operation of said relay in response to direct current transmitted over said line, and means for delaying the operation of said relay.

2. In combination in an electrical system, lines, a protective device for each of said lines, each device being connected to the conductors of the associated line, relays for disconnecting said devices from said lines, a self-locking relay having contact springs for controlling the operation of the first-mentioned relays, circuit means operatively connecting one winding of said self-locking relay to one of said lines, and circuit means operatively connecting another winding of said self-locking relay to another of said lines, the energization of said one winding being effective to close the contact between said springs and the energization of said other winding being effective to open the contact between said springs.

3. In combination in an electrical system, lines, a protective device for each of said lines, each device being connected to the conductors of the associated line, relays for disconnecting said devices from said lines, a control relay for controlling the operation of the first-mentioned relays, and circuit means for rendering the control relay operatively responsive to alternating current transmitted over any one of said plurality of lines and for preventing the operation of said control relay in response to direct current transmitted over any one of said plurality of lines.

4. In combination in an electrical system, a line, a protective device connected to the conductors of said line, a relay for disconnecting said device from said line, circuit means for controlling the operation of said relay, said circuit means being operatively responsive to a difference in potential in excess of a certain value across said conductors, and means for preventing the operation of said relay in response to a momentary difference in potential in excess of said certain value across said conductors.

5. In combination in an electrical system, lines, an induction coil connected across the conductors of each of said lines, the mid-point of each of said coils being connected to ground so as to drain longitudinal currents from the line, switching means for disconnecting said coils from said lines, circuit means for controlling the operation of said switching means, said circuit means being operatively responsive to a difference in potential in excess of a certain value across said conductors, and means for delaying the operation of said switching means so as to prevent its operation in case the operative response of said circuit means is momentary.

6. In combination in an electrical system, a line, a protective device connected to the conductors of said line, a relay for disconnecting said device from said line, circuit means comprising a three-element gas-filled tube for controlling the operation of said relay, the control elements of said tube being connected across the conductors of said line to cause breakdown of the tube when the difference in potential across said conductors is in excess of a certain value, and means for preventing the operation of said relay in response to a momentary difference in potential in excess of said certain value across said conductors.

7. In combination in an electrical system, a line, a protective device connected to the conductors of said line, a relay for disconnecting said device from said line, circuit means comprising a three-element gas-filled tube for controlling the operation of said relay, the control elements of said tube being connected across the conductors of said line to cause breakdown of the tube when the difference in potential across said conductors is in excess of a certain value, and means for preventing the operation of said relay in response to a momentary difference in potential in excess of said certain value across said conductors, said last-mentioned means comprising another three-element gas-filled tube.

8. In combination in an electrical system, a line, a protective device connected to the conductors of said line, a relay for disconnecting said device from said line, circuit means comprising a three-element gas-filled tube for controlling the operation of said relay, the control elements of said tube being connected across the conductors of said line to cause breakdown of the tube when the difference in potential across said conductors is in excess of a certain value, and means comprising a condenser for delaying the operation of said relay.

9. In combination in an electrical system, a line, a protective device connected to the conductors of said line, a relay for disconnecting said device from said line, circuit means comprising a three-element gas-filled tube for controlling the operation of said relay, the control elements of said tube being connected across the conductors of said line to cause breakdown of the tube when the difference in potential across said conductors is in excess of a certain value, and means comprising another three-element gas-filled tube and a condenser connected across the control elements of said other tube for delaying the operation of said relay.

10. In combination in an electrical system, lines, an induction coil connected to the conductors of each of said lines, the mid-point of each of said coils being connected to ground so as to drain longitudinal currents from the associated line, switching means for disconnecting said coils from said lines, means controlled over one of said lines for operating said switching means, and means controlled over another of said lines for releasing said switching means.

11. In combination in an electrical system, lines, a protective device for each of said lines, each device being connected to the conductors of the associated line, relays for disconnecting said devices from said lines, circuit means operatively unaffected by direct current and operatively responsive to alternating current transmitted over one of said lines for operating said relays, and circuit means operatively unaffected by direct current and operatively responsive to alternating current transmitted over another of said lines for releasing said relays.

12. In combination in an electrical system, lines, a protective device for each line and connected thereto, a relay for disconnecting said devices from said lines, means controlled over one of said lines for operating said relay, means for delaying the operation of said relay, means controlled over another of said lines for releasing said relay, and means for delaying the release of said relay.

13. In combination in an electrical system, lines, a protective device for each line normally connected therewith, a relay for disconnecting said devices from said lines, means controlled over one of said lines for operating said relay, said means comprising a rectifier and an electromagnet, and means controlled over another of said lines for releasing said relay, the last-mentioned means comprising a rectifier and an electromagnet.

14. In combination in an electrical system, lines, a conductive device for each line and normally connected therewith, a relay for disconnecting said devices from said lines, means controlled over one of said lines for effecting the operation of said relay, said means comprising a condenser, rectifier and electro-magnet connected in series to the conductors of said one line, and like means controlled over another of said lines for effecting the release of said relay.

15. In a combination according to claim 14, means comprising a condenser and a two-element gas-filled tube connected in series with the first-mentioned electromagnet and like means connected in series with the second-mentioned electromagnet for delaying the operation of said electromagnets.

16. In combination in an electrical system, lines, a protective device for each line and normally connected therewith, a relay for disconnecting said devices from said lines, means connected to and operatively controlled over one of said lines for effecting the operation of said relay, and like means connected to and operatively controlled over another of said lines.

17. In combination in an electrical system, lines, a protective device for each line and normally connected therewith, a relay for disconnecting said devices from said lines, means operatively controlled over one of said lines for effecting the operation of said relay, said means comprising a condenser, rectifier and relay connected in series to the conductors of said one of the lines, and like means operatively controlled over another of said lines for effecting the operation of said relay.

18. In combination in an electrical system, lines, a protective device for each line and normally connected therewith, a relay for disconnecting said devices from said lines, means operatively controlled over one of said lines for effecting the operation of said relay, said means comprising a condenser, rectifier and relay connected in series to the conductors of said one of the lines, like means operatively controlled over another of said lines for effecting the operation of said relay, and means for delaying the operation of said relay.

LELAND K. SWART.